US008984142B2

(12) United States Patent
Dickerson

(10) Patent No.: US 8,984,142 B2
(45) Date of Patent: Mar. 17, 2015

(54) METHODS, APPARATUSES AND COMPUTER PROGRAM PRODUCTS FOR FACILITATING REMOTE SESSION POOLING

(75) Inventor: Robert Scott Dickerson, Cary, NC (US)

(73) Assignee: McKesson Financial Holdings, Hamilton (BM)

( * ) Notice: Subject to any disclaimer, the term of this patent is extended or adjusted under 35 U.S.C. 154(b) by 766 days.

(21) Appl. No.: 12/650,142

(22) Filed: Dec. 30, 2009

(65) Prior Publication Data

US 2011/0161506 A1    Jun. 30, 2011

(51) Int. Cl.
*G06F 15/16* (2006.01)
*H04L 29/06* (2006.01)
*H04L 29/08* (2006.01)

(52) U.S. Cl.
CPC ........... *H04L 63/083* (2013.01); *H04L 65/1066* (2013.01); *H04L 67/14* (2013.01)
USPC ............................ 709/227; 709/217; 709/228

(58) Field of Classification Search
CPC .... H04L 63/083; H04L 65/1066; H04L 67/14
USPC .................. 709/201, 202, 203, 217, 218, 219
See application file for complete search history.

(56) References Cited

U.S. PATENT DOCUMENTS

| | | | | |
|---|---|---|---|---|
| 6,161,182 A * | 12/2000 | Nadooshan | | 713/172 |
| 6,947,982 B1 * | 9/2005 | McGann et al. | | 709/224 |
| 8,145,768 B1 * | 3/2012 | Hawthorne | | 709/228 |
| 2003/0018717 A1 * | 1/2003 | Haley et al. | | 709/205 |
| 2003/0195735 A1 * | 10/2003 | Rosedale et al. | | 703/13 |
| 2005/0273496 A1 * | 12/2005 | Jean et al. | | 709/206 |
| 2007/0113190 A1 * | 5/2007 | Clark et al. | | 715/748 |
| 2007/0133517 A1 * | 6/2007 | Miller et al. | | 370/352 |
| 2007/0234048 A1 * | 10/2007 | Ziv | | 713/159 |
| 2008/0235361 A1 * | 9/2008 | Crosbie et al. | | 709/223 |
| 2010/0138748 A1 * | 6/2010 | Sankararao et al. | | 715/733 |
| 2010/0232438 A1 * | 9/2010 | Bajpai et al. | | 370/400 |

* cited by examiner

*Primary Examiner* — Dhairya A Patel
(74) *Attorney, Agent, or Firm* — Alston & Bird LLP

(57) ABSTRACT

An apparatus is provided for generating a pool of remote session references that may be utilized to establish authenticated sessions. The apparatus includes a processor configured to generate remote session references that may be maintained in a pool. The remote session references may include information used to establish authenticated sessions with a secure device. The processor is also configured to determine whether a remote session reference(s) of the pool may be borrowed in response to receipt of a request for a resource(s) on the secure device. Additionally, the processor may perform a test on a borrowed remote session reference when a determination reveals that one of the remote session references may be borrowed. The processor may also provide the secure device with the borrowed remote session reference and a request for the resource(s) in response to determining that the test passed. Corresponding computer program products and methods are also provided.

21 Claims, 10 Drawing Sheets

METHODS, APPARATUSES AND COMPUTER PROGRAM PRODUCTS FOR FACILITATING REMOTE SESSION POOLING

TECHNOLOGICAL FIELD

Embodiments of the present invention relate generally to a mechanism of more efficiently authenticating sessions and, more particularly, relate to a method, apparatus and computer program product for reducing the overhead of establishing one or more authenticated sessions with a secure device.

BACKGROUND

Currently, web resources may be accessed from a secured remote server that requires authentication of a user prior to providing the user with requested content. In order to authenticate the user so that the user may access the web resources (e.g., web pages, forms, static files, dynamic content, etc.) from the secured remote server (e.g., web server), a user typically utilizes a communication device to communicate with the remote server and may start a session which returns a session identifier to the user's communication device. Once the user's communication device receives the session identifier from the remote server, the communication device may use the session identifier in subsequent requests for resources to the remote server.

For example, upon receipt of the session identifier from the remote server, the communication device may include the session identifier in subsequent hypertext transfer protocol (HTTP) requests to the remote server such as, for example, a HTTP Get operation in which a request for a specified resource may be generated or a HTTP Post operation in which data may be submitted for processing in a request. In this regard, the session identifier may be included in subsequent HTTP requests sent to the remote server as either a request parameter or as a cookie.

Since the user's communication device may provide the remote server with a session identifier corresponding to a previously authenticated session, the remote server will typically grant the communication device access to the requested secured resource without requiring the user to be re-authenticated. In this manner, an authenticated session with a remote server may be established. It should be pointed out however that the current mechanisms of initializing an authenticated session on the remote server may suffer from a number of drawbacks. For instance, the initialization of an authenticated session on the remote server may be time consuming given that a separate authentication request is typically required to be sent to a web application prior to sending a request for the secured resource. This may result in an inefficient use of processing capacity and it may unduly increase overhead (e.g., load capacity) on the remote server.

One approach to reduce the overhead of establishing an authenticated session may be to modify a corresponding web application on the remote server with the secured resource to allow for receipt of user credentials (e.g., a username and password) with each request for a secured resource so that the user may be authenticated before granting access to the resource. This may eliminate the need to send a separate authentication request to a corresponding web application of the remote server prior to sending the request for the secured resource. However, this solution may be inadequate or undesirable since the changes to the secured web application may require the remote server to support the receipt of user credentials with the receipt of every request for a secured resource. As such, an undue burden may be imposed on the remote server.

In view of the foregoing drawbacks, it may be desirable to provide a mechanism that more effectively establishes authenticated sessions and reduces the load, bandwidth and processing requirements on one or more devices involved in establishing an authenticated session with a secured web application.

BRIEF SUMMARY

A method, apparatus and computer program product are therefore provided that enable the provision of a pool of remote session references that may be utilized to establish authenticated sessions with a secure device. In an exemplary embodiment, the remote session references may, but need not be, HTTP remote session references.

In particular, the exemplary embodiments may automatically generate the pool of remote session references based on predefined criteria regarding a minimum number of remote session references required for the pool. In an exemplary embodiment, the pool may be generated upon startup or initialization of a computing device. Moreover, it should be pointed out that the remote session references in the pool may be generated by a device that clones (e.g., copies) or replicates a prototype of a remote session reference (e.g., prototype of a remote HTTP session reference) that may be used to create one or more remote session references that reference authenticated sessions on a secure device. Each remote session reference in the pool may include information identifying a secure device and an application context in which the remote session reference is to be authenticated. It should also be pointed out that each remote session reference may maintain session data that have been set by the secure device in the course of handling a logon request or any other suitable request(s). In this regard, the remote session references may store and provide session data as provided and requested by the secure device during the process of executing a request (e.g., a cookie to be stored containing the session identifier may be returned following a logon request).

When a computing device receives a request, from another device (e.g., a client device such as for e.g., a personal computer), for resources on a secure device (e.g., secure server) or desires to make a request for resources on its own behalf, the computing device (e.g., a server) may determine whether at least one of the remote session references in the pool may be borrowed. The computing device may determine that one of the remote session references may be borrowed based in part on whether the pool includes a minimum number of remote session references and whether a remote session reference is idle (e.g., not currently borrowed from the pool). In response to determining that one of the remote session references may be borrowed, the computing device may flag or mark the remote session reference as borrowed and perform a test on the borrowed remote session reference to determine whether the borrowed remote session reference is currently referencing an authenticated session on the secure device.

This test may involve checking the last time the borrowed remote session reference was tested and determining whether a time since the borrowed remote session reference was last tested is longer than a predetermined or predefined validation frequency setting of the remote session reference. (It should be pointed out that the validation frequency setting may be a period of time less than the session time out period setting of the secure device. Upon expiration of the time out period, the secure device may de-activate a current session.) If the computing device determines that the time since the last test is longer than the validation frequency, the borrowed remote session reference may be validated by sending a keep-alive signal to the secure device. If the keep-alive signal fails (e.g., is not successfully acknowledged by the secure device), the computing device may attempt to logon to the secure device to authenticate the session.

However, if the test passes (e.g., the time since the last test is less than the validation frequency) the computing device may use the borrowed remote session reference to request secured resources on behalf of another device or on its own behalf. In response to receiving the requested resources the computing device may return the borrowed remote session reference to the pool and may, but need not, send the received resources to another device that originally requested the resources. In this regard, the computing device may grant exclusive use of a borrowed remote session reference during the processing of a request (e.g., a request for a resource(s)) from another device until the borrowed remote session reference is returned to the pool.

It should be pointed out that if the computing device determines that there are no remote session references available in the pool to be borrowed, the computing device may clone or replicate the prototype remote session reference to generate a new remote session reference that may be added to the pool. In this regard, the computing device may borrow the new remote session reference to establish an authenticated session with the secured device so that the requested resources may be retrieved from the secure device.

Additionally, the computing device may be configured to test idle remote session references of the pool at a frequency less than that of the session "timeout" established by the secure device to ensure that the sessions on the secure device referenced by the remote session references do not "time out". The computing device may also maintain a minimum and/or maximum number of remote session references. In this regard, the computing device may automatically create new remote session references to maintain the defined minimum for the pool. The computing device may also remove any remote session references that remain idle for a predetermined time period. In this regard, the computing device may shrink the number of remote session references in the pool to maintain a minimum number of remote session references. The minimum number of remote session references may be predefined for the pool by a network operator for example or a setting predefined on the computing device.

In one exemplary embodiment, a method for generating and maintaining a pool of remote session references that may be utilized to establish authenticated sessions is provided. The method may include generating one or more remote session references that may be maintained in a pool. The remote session references may include information that is utilized to establish one or more authenticated sessions with a secure device. The method may also include determining whether at least one of the remote session references may be borrowed in response to receipt of a request for a resource(s) on the secure device, performing a test on a borrowed remote session reference when the determination reveals that at least one of the remote session references may be borrowed and providing the secure device with the borrowed remote session reference and a request for a resource(s) in response to determining that the test passed.

In another exemplary embodiment, an apparatus for generating and maintaining a pool of remote session references that may be utilized to establish authenticated sessions is provided. The apparatus includes a processor configured to generate one or more remote session references that may be maintained in a pool. The remote session references may include information that is utilized to establish one or more authenticated sessions with a secure device. The processor may also determine whether at least one of the remote session references may be borrowed in response to receipt of a request for a resource(s) on the secure device, perform a test on a borrowed remote session reference when the determination reveals that at least one of the remote session references may be borrowed and provide the secure device with the borrowed remote session reference and a request for a resource(s) in response to determining that the test passed.

In another exemplary embodiment, a computer program product for generating and maintaining a pool of remote session references that may be utilized to establish authenticated sessions is provided. The computer program product may include at least one computer-readable storage medium having computer-executable program code instructions stored therein. The computer-executable program code instructions may include program code instructions for generating one or more remote session references that may be maintained in a pool. The remote session references may include information that is utilized to establish one or more authenticated sessions with a secure device. The program code instructions may also determine whether at least one of the remote session references may be borrowed in response to receipt of a request for a resource(s) on the secure device, perform a test on a borrowed remote session reference when the determination reveals that at least one of the remote session references may be borrowed and provide the secure device with the borrowed remote session reference and a request for a resource(s) in response to determining that the test passed.

Embodiments of the invention may provide a method, apparatus, and computer program product for facilitating a fast and efficient approach to retrieving resources from secure devices by maintaining a pool of references to previously-authenticated sessions on secure devices and may reduce the overhead of the devices involved with the sharing of these remote session references in the pool. As a result, communication device users may enjoy improved response times when requesting resources from a computing device when those resources are ultimately retrieved from a secure device using a remote session reference borrowed from the pool.

BRIEF DESCRIPTION OF THE SEVERAL VIEWS OF THE DRAWINGS

Figure 1:
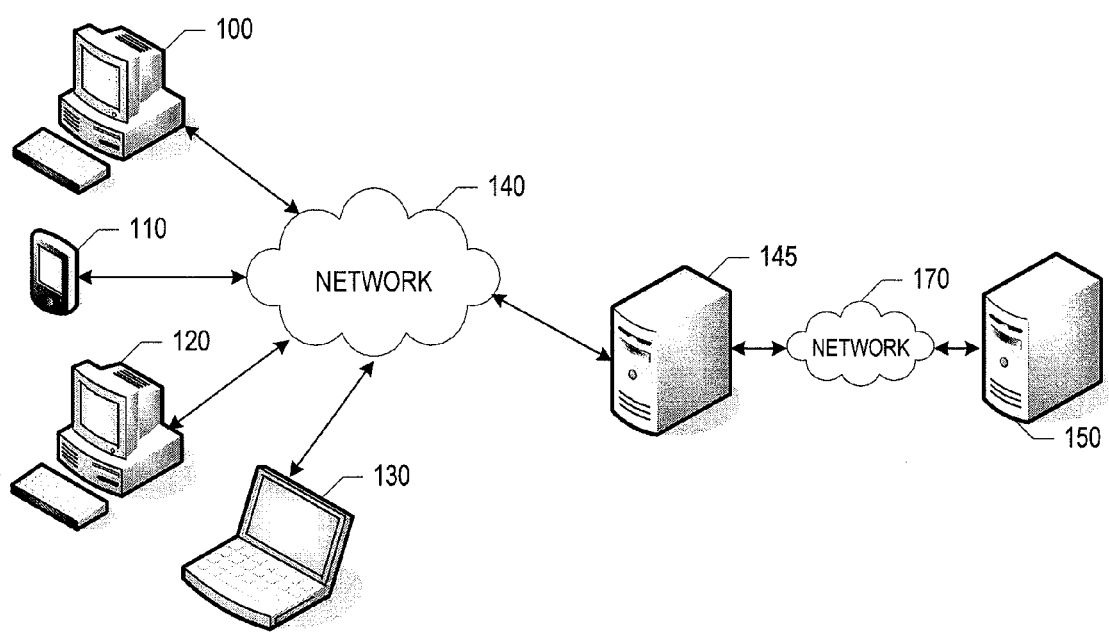
Figure 2:
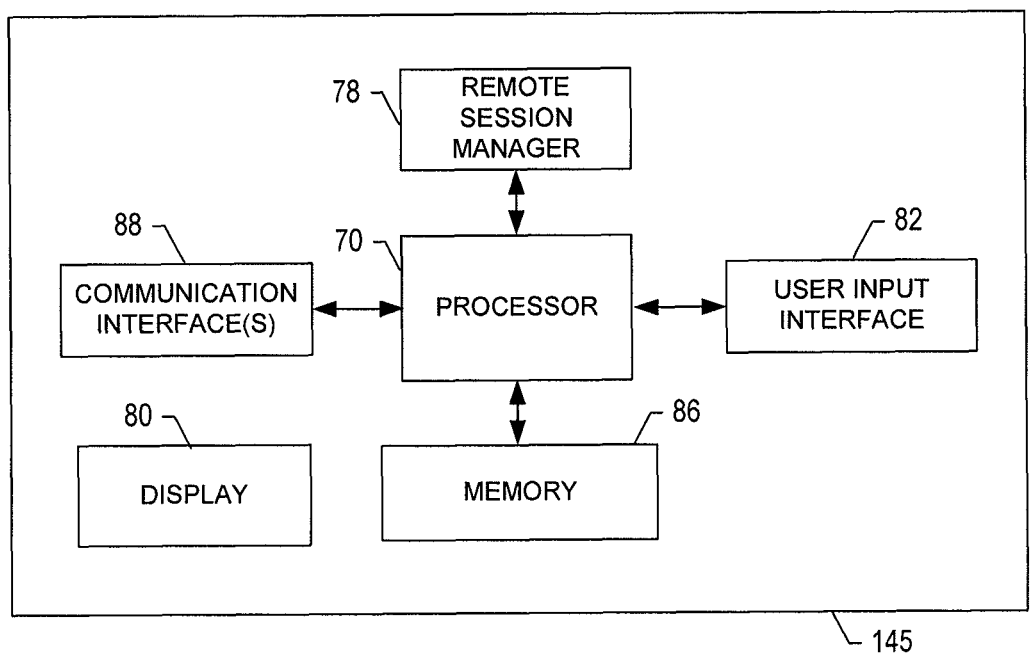
Figure 3:
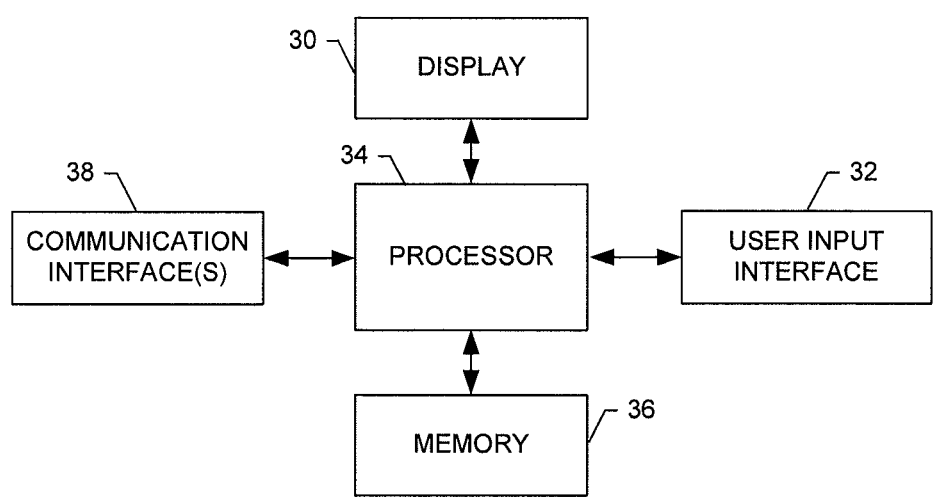
Figure 4:
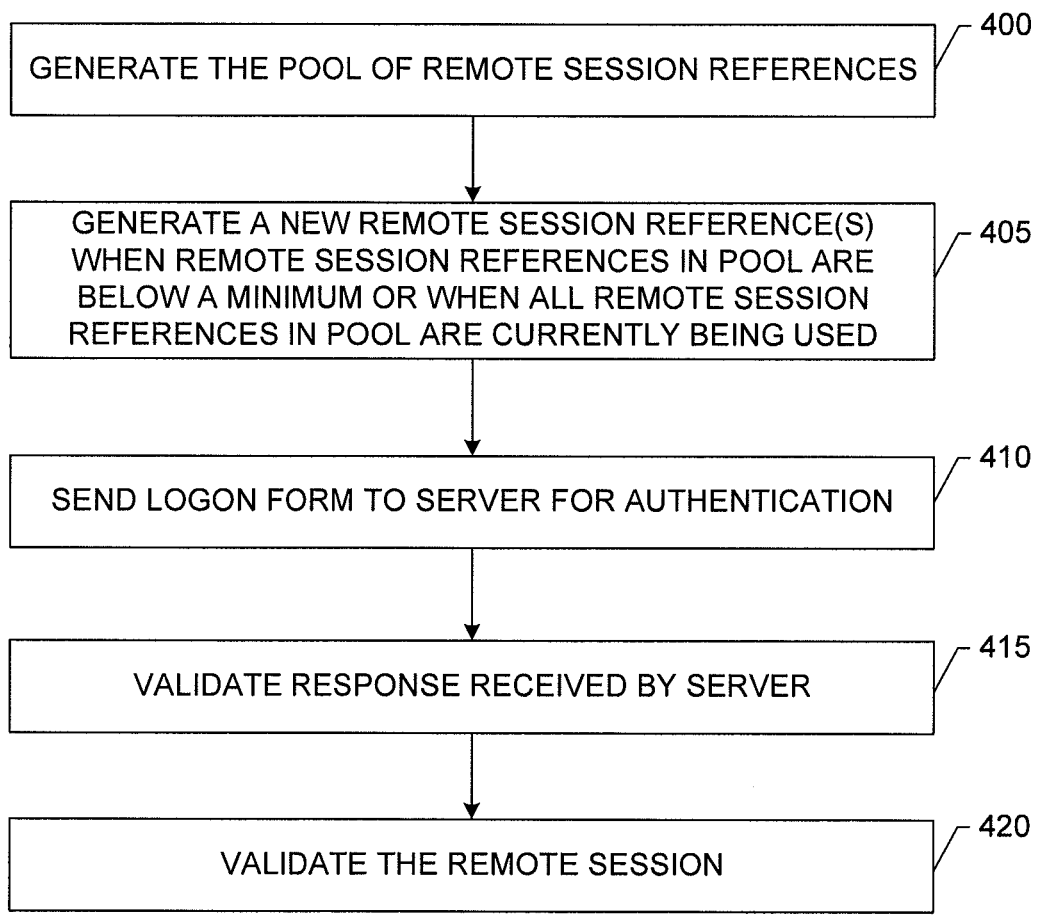
Figure 5:
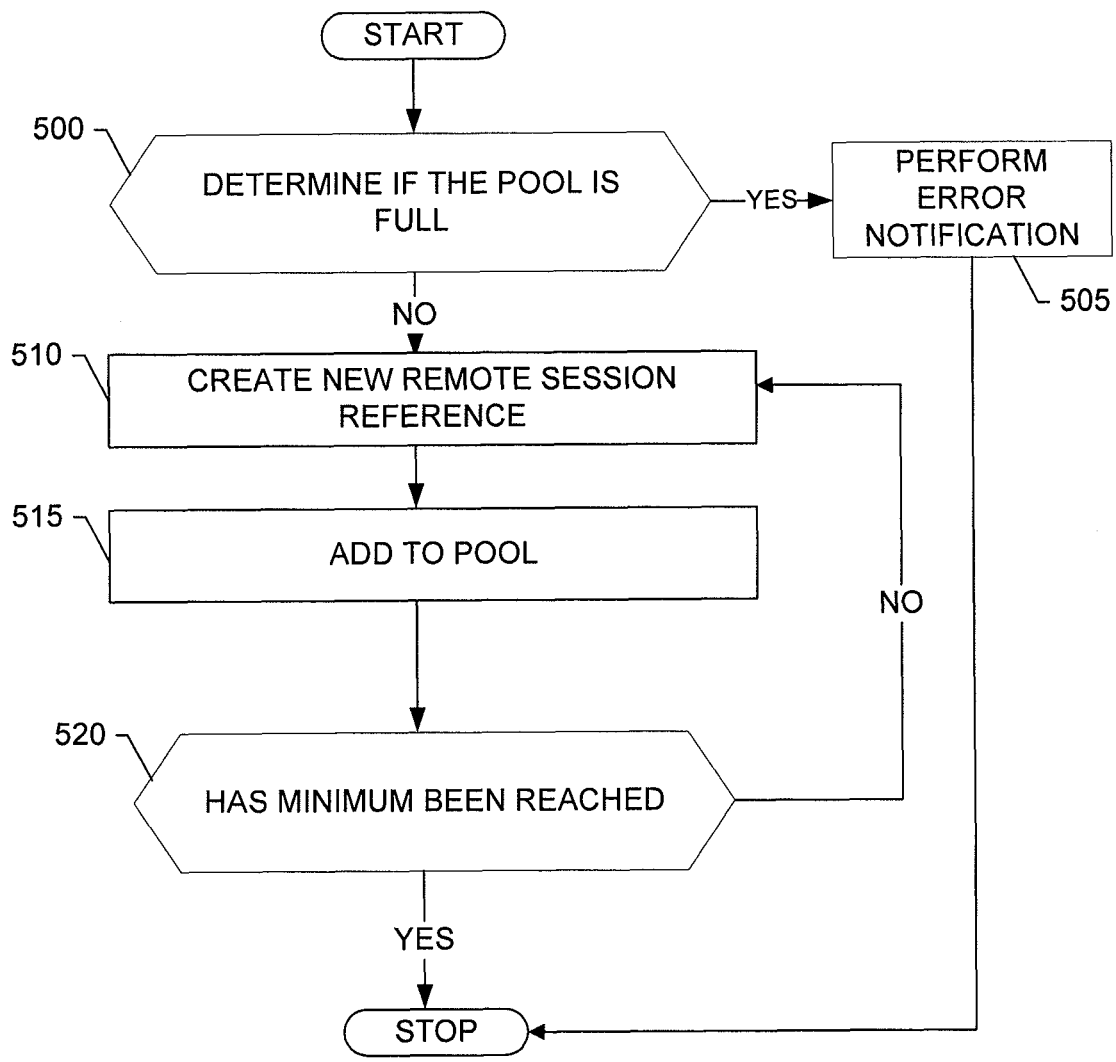
Figure 6:
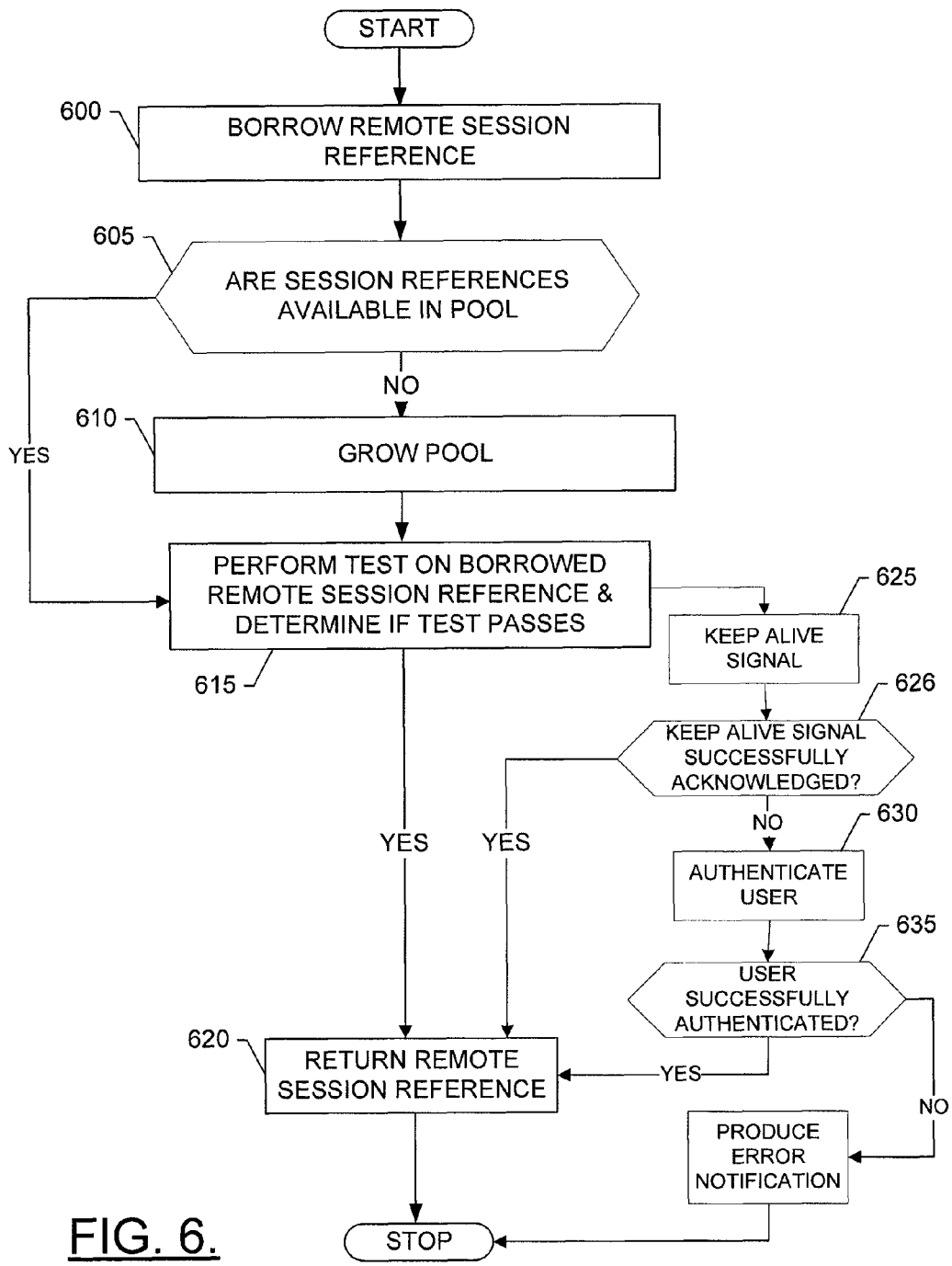
Figure 7:
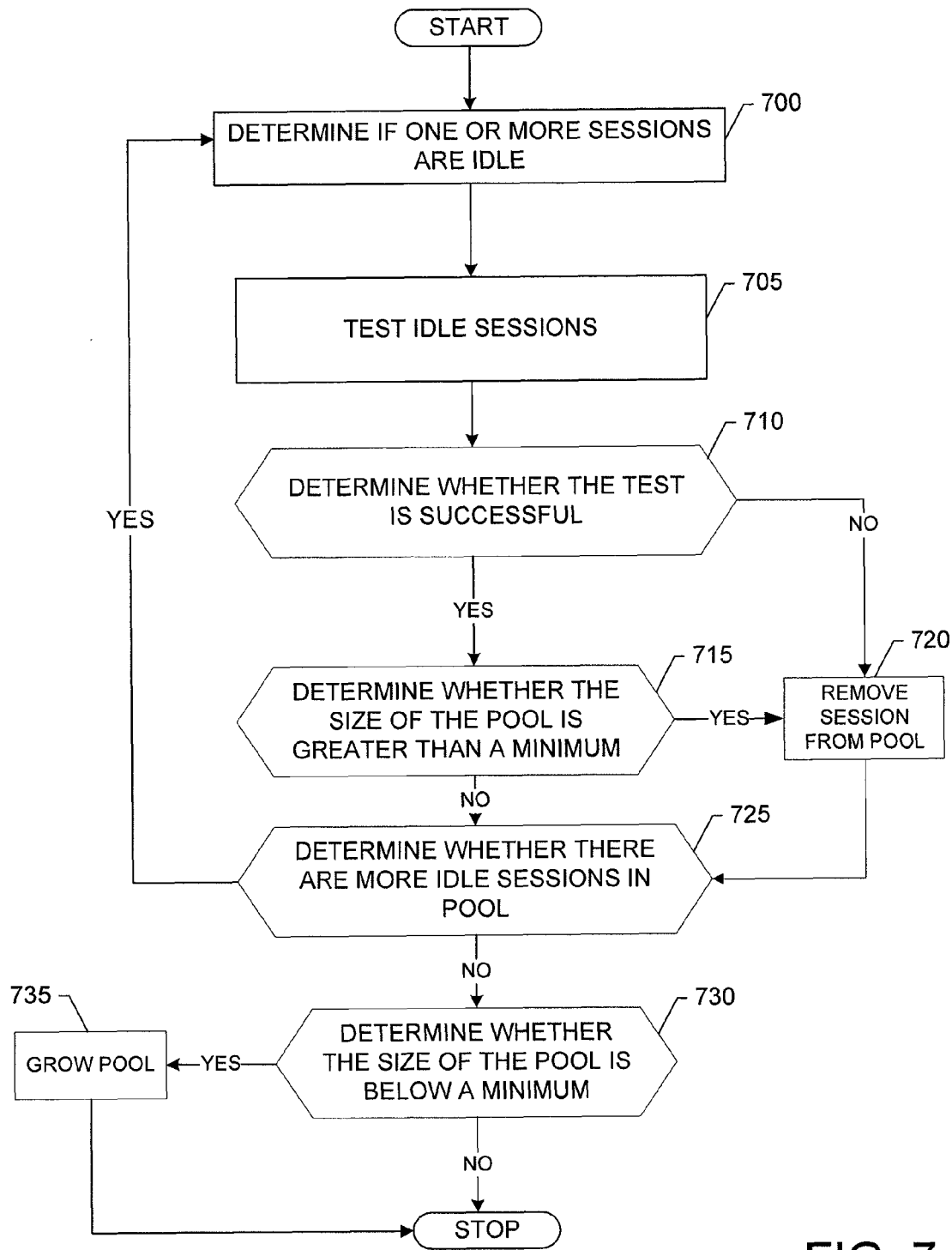
Figure 8:
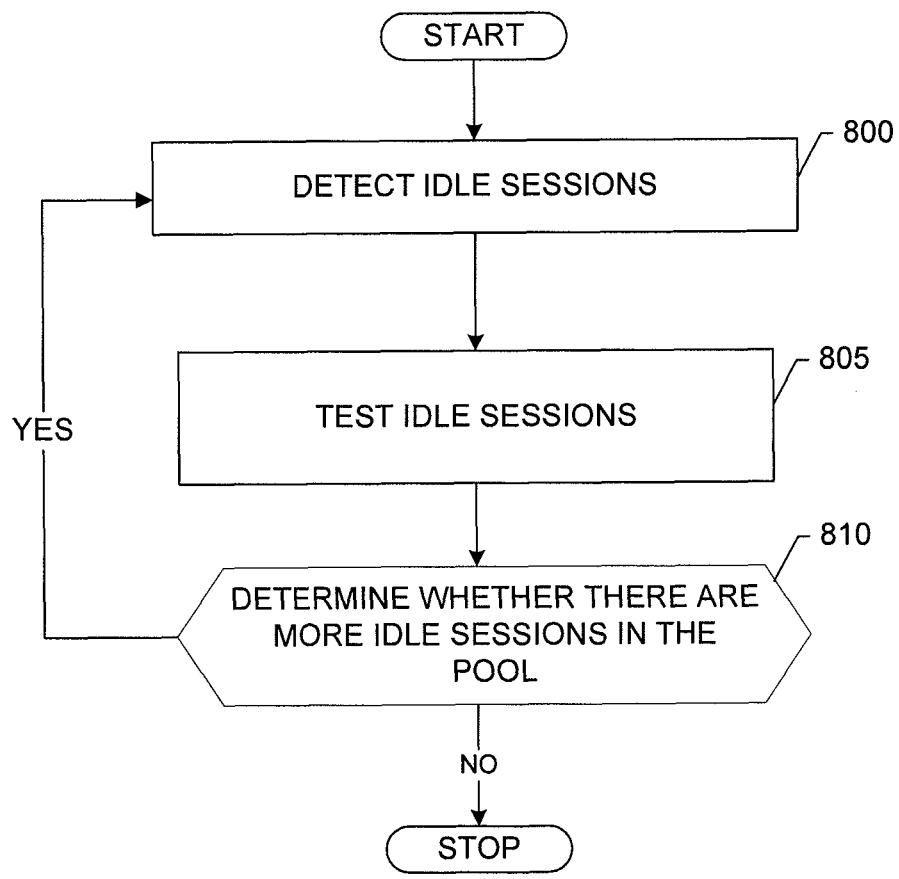
Figure 9:
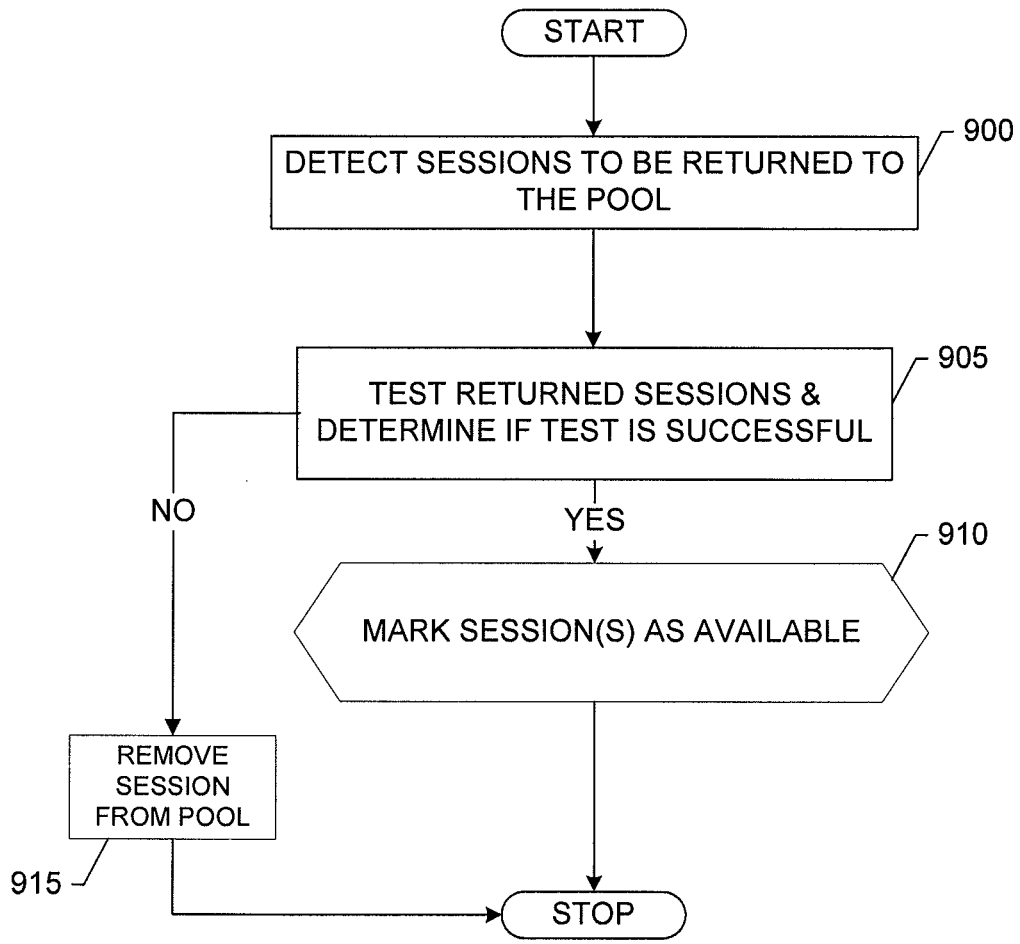
Figure 10:
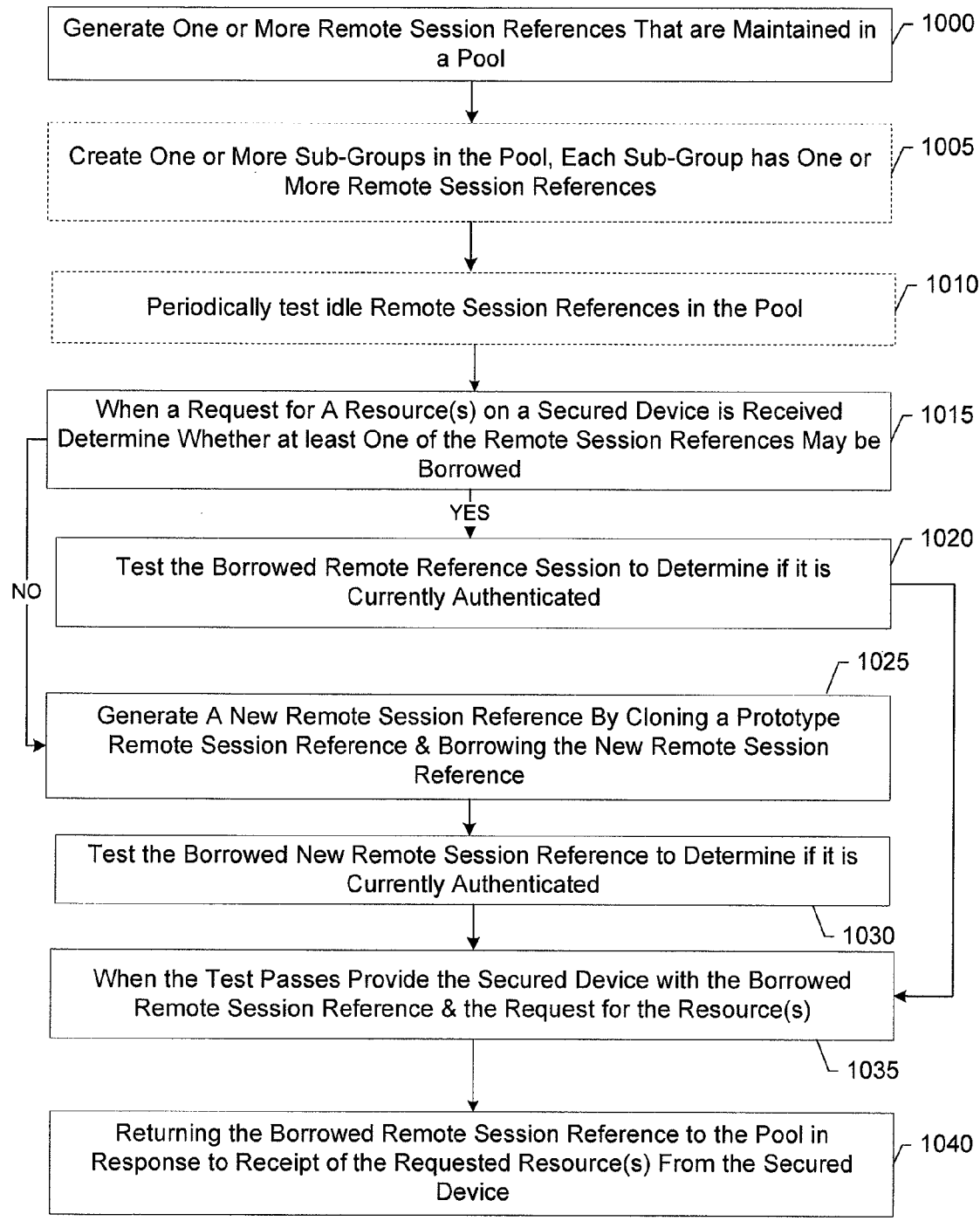

Having thus described the invention in general terms, reference will now be made to the accompanying drawings, which are not necessarily drawn to scale, and wherein:

FIG. 1 is a schematic block diagram of a system according to an exemplary embodiment of the invention;

FIG. 2 is a schematic block diagram of a computing device according to an exemplary embodiment of the invention;

FIG. 3 is a schematic block diagram of a communication device according to an exemplary embodiment of the invention;

FIG. 4 is a flowchart of an exemplary method for configuring a pool of remote session references according to an exemplary embodiment of the invention;

FIG. 5 is a flowchart of an exemplary method for growing a pool of remote session references according to an exemplary embodiment of the invention;

FIG. 6 is a flowchart of an exemplary method for borrowing a remote session reference(s) from a pool according to an exemplary embodiment of the invention;

FIG. 7 is a flowchart of an exemplary method for shrinking one or more remote session references from a pool according to an exemplary embodiment of the invention;

FIG. 8 is a flowchart of an exemplary method for ensuring remote session references are ready and available when needed according to an exemplary embodiment of the invention;

FIG. 9 is a flowchart of an exemplary method for returning one or more remote session references to the pool according to an exemplary embodiment of the invention; and FIG. 10 is a flowchart of an exemplary method for generating and maintaining a pool of remote session references that may be utilized to establish authenticated sessions according to an exemplary embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

General Overview

In general, according to various embodiments of the invention, methods, apparatuses, systems and computer program products are provided for cloning or replicating a prototype of a remote session reference (e.g., remote HTTP session reference) that may be used to authenticate one or more sessions with a secured device (e.g., server 150). Additionally, the exemplary embodiments may maintain a pool of remote session references and a remote session reference(s) in the pool may be borrowed to establish an authenticated session(s) with a secure device.

In this regard, when secure resources maintained by a secure device are desired or requested, the exemplary embodiments may borrow an existing remote session reference from the pool to establish an authenticated session with the secure device. If there are no remote session references in the pool that may be borrowed, the exemplary embodiments may generate a new remote session reference by cloning or replicating a prototype of a remote session reference. This new remote session reference may then be used to establish an authenticated session with the secure device.

General System Architecture

Reference is now made to FIG. 1, which is a block diagram of an overall system that would benefit from exemplary embodiments of the invention. As shown in FIG. 1, the system may include one or more electronic devices 100, 110, 120, 130 (e.g., personal computers, laptops, personal digital assistants and the like, etc.) which may access one or more network entities such as for example a computing device 145 (e.g., a server), or any other similar network entity, over a network 140, such as a wired local area network (LAN) or a wireless local area network (WLAN), a metropolitan network (MAN) and/or a wide area network (WAN) (e.g., the Internet). While four electronic devices 100, 110, 120 and 130 (also referred to herein as client devices) are shown in FIG. 1, it should be pointed out that any suitable number of electronic devices may be part of the system of FIG. 1. In this regard, the computing device 145 is capable of receiving data from and transmitting data to the electronic devices 100, 110, 120 and 130 via network 140.

Similarly, the computing device 145 may communicate with a network entity such as for example server 150 or any other similar network entity via network 170. In this regard, the computing device 145 may receive data from and transmit data to the server 150. The network 170 may be a wired or wireless local area network (LAN), a metropolitan network (MAN) and/or a wide area network (WAN) (e.g., the Internet). The server 150 may maintain and operate one or more secure sites such as for example one or more secured websites and may maintain secure resources.

Computing Device

FIG. 2 illustrates a block diagram of a computing device according to an exemplary embodiment of the invention. The computing device 145 may, but need not, be a network entity such as for example, a server. The computing device 145 includes various means for performing one or more functions in accordance with exemplary embodiments of the invention, including those more particularly shown and described herein. It should be understood, however, that one or more of the computing devices may include alternative means for performing one or more like functions, without departing from the spirit and scope of the invention. More particularly, for example, as shown in FIG. 2, the computing device may include a processor 70 connected to a memory 86. The memory may comprise volatile and/or non-volatile memory, and typically stores content (media content), data, information or the like.

For example, the memory may store content transmitted from, and/or received by, the computing device. In an exemplary embodiment, the memory 86 may store one or more remote session references (e.g., remote HTTP session references) that may be used to establish an authenticated session(s) with a server (e.g., server 150). The remote session references may include one or more session identifiers (e.g., a string of numbers identifying a session) as well as any other suitable information. The memory 86 may also store one or more forms such as for example one or more form posts (e.g., HTTP form posts). The form posts may include, but are not limited to, one or more fields corresponding to an address in which to post a form and one or more fields required to logon to a server (e.g., server 150) to authenticate a user(s) as well as any other suitable fields. In an exemplary embodiment, the fields associated with the address may relate to an address of a website maintained by a server. In this regard, the address may, but need not, be a uniform resource locator (URL) or a uniform resource identifier (URI).

The memory 86 may also store a prototype of a remote session reference (e.g., a prototype remote HTTP session reference) that includes, but is not limited to, a host name, port and an application context (also referred to herein as application name) maintained by a server (e.g., server 150) that may receive requests (e.g., HTTP requests) for resources or information. As described more fully below, the prototype remote session reference may be cloned or replicated to generate additional remote session references which may be used to establish authenticated sessions with a secure server (e.g., server 150). In this regard, each time the prototype remote session reference is cloned to create a new remote session reference, the host name, port and application context of the server is assigned to the new remote session reference as well as any other suitable information (e.g., a logon form such as for e.g., a HTTP form post).

Also for example, the memory 86 typically stores client applications, instructions or the like for execution by the processor 70 to perform steps associated with operation of the computing device in accordance with embodiments of the invention. As explained below, for example, the memory 86 may store one or more client application(s) such as for example software (e.g., computer code).

The processor 70 may be embodied in a variety of ways. For instance, the processor 70 may be embodied as a controller, coprocessor microprocessor of other processing devices including integrated circuits such as for example an application specific integrated circuit (ASIC), a field programmable gate array (FPGA). In an exemplary embodiment, the processor may execute instructions stored in the memory 86 or otherwise accessible to the processor 70.

The computing device 145 may include one or more logic elements for performing various functions of one or more client application(s). In an exemplary embodiment, the computing device 145 may execute the client application(s). The logic elements performing the functions of one or more client applications can be embodied in an integrated circuit assembly including one or more integrated circuits (e.g., an ASIC, FPGA or the like) integral or otherwise in communication with a respective network entity (e.g., computing system, client, server, etc.) or more particularly, for example, a processor 70 of the respective network entity.

In addition to the memory 86, the processor 70 may also be connected to at least one interface or other means for displaying, transmitting and/or receiving data, content or the like. The interface(s) can include at least one communication interface 88 or other means for transmitting and/or receiving data, content or the like. In this regard, the communication interface 88 may include, for example, an antenna and supporting hardware and/or software for enabling communications with a wireless communication network. For example, the communication interface(s) may include a first communication interface for connecting to a first network, and a second communication interface for connecting to a second network. In this regard, the computing device is capable of communicating with other electronic devices (e.g., electronic devices 100, 110, 120, 130 and server 150) over one or more networks (e.g., networks 140 and 170) such as a Local Area Network (LAN), wireless LAN (WLAN), Wide Area Network (WAN), Wireless Wide Area Network (WWAN), the Internet, or the like. Alternatively, the communication interface can support a wired connection with the respective network.

In addition to the communication interface(s), the interface(s) may also include at least one user interface that may include one or more earphones and/or speakers, a display 80, and/or a user input interface 82. The user input interface, in turn, may comprise any of a number of devices allowing the entity to receive data from a user, such as a microphone, a keypad, keyboard, a touch display, a joystick, image capture device, pointing device (e.g., mouse), stylus or other input device.

In an exemplary embodiment, the processor 70 may in communication with and may otherwise control a remote session manager 78. The remote session manager 78 may be any means such as a device or circuitry operating in accordance with software or otherwise embodied in hardware or a combination of hardware and software thereby configuring the device or circuitry (e.g. a processor or controller) to perform the corresponding functions of the remote session manager 78 as described below. In examples in which software is employed, a device or circuitry (e.g., processor 70 in one example) executing the software forms the structure associated with such means. As such, for example, the remote session manager 78 may be configured to provide among other things, for the generating and maintaining a pool or group of one or more remote session references (e.g., remote HTTP session references) that may be used to establish authenticated sessions, as described more fully below. For instance, the remote session manager 78 may clone or replicate a prototype remote session to generate new remote session references that may be grouped or pooled together and which may be utilized to establish authenticated sessions. The authenticated sessions may be used to allow the computing device 145 to receive a requested resource(s) from a secure device (e.g., server 150). In response to receiving the requested resource from the secure device (e.g., server 150), the remote session manager 78 may, but need not, provide the requested resource(s) to one or more of the electronic devices 100, 110, 120 and 130.

Communication Device

Referring now to FIG. 3, a block diagram of a communication device shown in accordance with an exemplary embodiment of the invention is provided. The communication device is capable of operating as server 150 or any of electronic devices 100, 110, 120 and 130. In this regard, the server 150 and electronic devices 100, 110, 120 and 130 may comprise the elements of the communication device of FIG. 3. As shown in FIG. 3, the communication device may include a processor 34 connected to a memory device 36. The memory device 36 may comprise volatile and/or non-volatile memory, and may store content, information, data (e.g., forms, web pages, etc.) or the like. For example, the memory device 36 typically stores content transmitted from, and/or received by, the communication device. Additionally, the memory device 36 may store client applications (e.g., software), algorithms, instructions or the like for the processor 34 to perform steps associated with operation of the communication device.

The communication device may also include a processor 34 that may be connected to at least one communication interface 38 or other means for displaying, transmitting and/or receiving data, content, information or the like. In this regard, the communication interface 38 may be capable of connecting to one or more networks. The communication device may also include at least one user input interface 32 that may include one or more speakers, a display 30, and/or any other suitable devices. For instance, the user input interface 32 may include any of a number of devices allowing the communication device to receive data from a user, such as a keyboard, a keypad, mouse, a microphone, a touch screen display, or any other input device.

Exemplary System Operation

Reference will now be made to FIGS. 4-9 which show flowcharts of exemplary methods for generating and managing resources for a pool of remote session references that may be utilized to establish authenticated sessions with a secure device (e.g., server 150). In particular, FIGS. 4-9 are flowcharts for (a) configuring a pool of remote session references, (b) growing a pool of remote session references, (c) borrowing a remote session references from a pool, (d) shrinking or removing one or more remote session references from the pool, (e) ensuring remote session references are ready and available when needed, and (f) returning one or more remote session references to the pool according to an exemplary embodiment of the invention.

It should be pointed out that the remote session references and the prototype remote session references described below may be remote HTTP session references and prototype remote HTTP session references utilizing a hypertext transfer protocol. However, it should be pointed out that the exemplary embodiments are not limited to HTTP and may be utilized for retrieving any resources from a secure device (e.g., server) via mechanisms other than HTTP (e.g., utilizing one or more socket connections). By utilizing the methods of FIGS. 4-9, the exemplary embodiments facilitate a fast and efficient approach to establishing authenticated sessions with secured devices and may reduce the overhead (e.g., computation time, memory, bandwidth, or other resources) of the devices (e.g., computing device 145 and server 150) involved in the authenticated sessions.

a. Configuring a Pool of Remote Session References

Referring now to FIG. 4, a flowchart of an exemplary method for configuring a pool of remote session references according to an exemplary embodiment is provided. It should be pointed out that the remote session manager 78 of the computing device 145 may create, remove, activate, and validate one or more remote session references in a pool of remote session references. In order to create or generate the pool of remote session references, the remote session manager 78 may generate a prototype (or a master copy) of a remote session reference (also referred to herein as prototype) and clone the prototype a number of times associated with a minimum number of remote session references defined to establish the pool. (See operation 400) As referred to herein, the terms "clone," "cloned," "cloning" or the like may relate to a copy, duplicate or replicate of the prototype. In an exemplary embodiment, the pool of remote session references may be generated by the remote session manager 78 during initialization or start-up of the computing device 145.

It should also be pointed out that the remote session manager 78 may generate a new remote session reference by cloning the prototype when the remote session manager 78 determines that the pool of remote session references is below a predetermined threshold (e.g. a minimum) or when all the remote sessions in the pool are currently being used to establish an authenticated session with a server. (See operation 405) Additionally, it should also be pointed out that in an exemplary embodiment, the prototype that may be used to create a new remote session reference may not actually be in the pool of remote session references and in this regard, the prototype may not be borrowed by the remote session manager 78 to authenticate a session. As such, in one exemplary embodiment, the prototype may not be associated with information indicating an active session of a server (e.g., server 150). However, in an alternative exemplary embodiment, the prototype may be in the pool of remote session references and may be borrowed to authenticate a session with a server and may also be associated with information indicating an active session. In this alternative exemplary embodiment, the remote session manager 78 may generate another prototype if the original prototype is borrowed for a session.

The remote session manager 78 may assign authentication information and logon information to the prototype. In this regard, the authentication information may include but is not limited to a host name, port, and an application context (e.g., the name of an application) of a server (e.g., server 150) that the computing device 145 may send requests (e.g., HTTP requests) for resources. The logon information may include one or more predefined fields for authenticating a user. In this regard, the logon information may include fields for a username (e.g., "remoteclient") and a password (e.g., "McKesson") of a valid user as well as any other suitable fields. The logon information may also be included in a form such a logon form (also referred to herein as logon form post). It should be pointed out that the username and password may be predefined and assigned by a network operator or the like or randomly generated by the remote session manager 78. As such, the same username and password of the logon information may be used to authenticate multiple sessions. In this regard, each time the prototype is cloned, the remote session manager 78 may assign the authentication information and the logon information to the new remote session reference.

The remote session manager 78 may send or post the logon form information associated with the new remote session reference, generated based on the prototype, to the server 150 and the server may use this information to authenticate a user. (See operation 410) For instance, the server 150 may analyze data associated with an account or profile of a user to verify that the username and password are valid and on this basis the server may authenticate a user.

The remote session manager 78 may validate a response received from a server (e.g., server 150) after the logon form is submitted to the server. (See operation 415) In this regard, the remote session manager 78 may validate the response (e.g., a web page) received from the server by evaluating a status code (e.g., a number such as for example 200 which indicates that the request (e.g., HTTP request) was successful). In addition, the remote session manager 78 may validate the response received from the server by searching the response for a particular character string (for example to verify that the correct web page was received). In response to the remote session manager 78 validating the response received from the server, the remote session manager 78 may send the new remote session reference to the server 150 to establish an authenticated remote session between the server (e.g., server 150) and the computing device 145.

The remote session manager 78 may validate the remote session reference. (See operation 420). In order to validate a remote session reference, the remote session manager 78 may perform a check to determine if a period of time referred to herein as a validation frequency has elapsed since the last time the respective remote session was validated. In an exemplary embodiment, the validation frequency may be a time period that is less than a time out period. For example, remote sessions may be associated with a time out period in which the session may be de-activated upon the expiration of the time out period without user activity. If a time out period is 15 minutes, for example, a validation frequency may be every 10 minutes. In response to the remote session manager 78 determining that not enough time has passed (e.g., 5 minutes since the last time the remote session reference was tested and the validation frequency is 10 minutes), the remote session manager 78 may determine that the remote session is valid.

On the other hand, in response to the remote session manager 78 determining that the validation frequency period has elapsed, the remote session manager 78 may send the server a keep-alive signal (e.g., a keep-alive URI (e.g., website address)) to keep the session active. If the remote session manager 78 does not receive confirmation or the expected response from the server (e.g., server 150) (e.g., the server does not respond to the keep-alive signal with a redirect to the logon page of the server) the remote session manager 78 may re-authenticate the session by sending the logon form (e.g., logon form post) which contains the username and password to the server (e.g., server 150).

b. Grow Pool of Session References

Referring now to FIG. 5, a flowchart of an exemplary method for growing a pool of remote session references according to an exemplary embodiment is provided. In this regard, the remote session manager 78 may determine whether the pool is currently, full. (See operation 500) The remote session manager 78 may determine whether the pool is full by evaluating a predefined setting stored in a database or memory (e.g., memory 86) of the computing device 145. For example, the setting may specify that pool is full when it includes a maximum of remote session references (e.g., 12 remote session references). When the remote session manager 78 determines that the pool is full the remote session manager 78 may perform an error notification. (See operation 505). In an exemplary embodiment, the remote session manager 78 may perform the error notification by generating an error message that is provided to the display 80 of the computing device 145.

When the remote session manager 78 determines that the pool is not full of remote session references, the remote session manager 78 may create a new remote session reference by cloning the prototype in the manner described above. (See operation 510) The remote session manager 78 may then add the new remote session reference to the pool of remote session references. (See operation 515) Subsequently, the remote session manager 78 may determine whether a minimum number of remote session references are in the pool. (See operation 520) The remote session manager 78 may determine whether there are a minimum number of remote session references in the pool by evaluating the predefined setting stored in a database or memory of the computing device 145. In this regard, the predefined setting may specify a minimum number (e.g., 4 remote session references) of remote session references that are required for the pool. When the remote session manager 78 determines that there are a minimum number of remote session references in the pool, the process ends.

On the other hand, when the remote session manager 78 determines that the minimum amount or number of remote session references are not in the pool, the remote session manager 78 may generate a new remote session reference by cloning the prototype (see operation 510) and the process is repeated (see operations 515 & 520). It should be pointed out above that the predefined setting may be established and changed by an operator such as for example a network operator or the like. In this regard, the operator may define the minimum and maximum number of session references for the pool.

c. Borrow One or More Session References from the Pool

Referring now to FIG. 6, a flowchart of an exemplary method for borrowing a remote session reference from a pool according to an exemplary embodiment is provided. When a user desires to establish an authenticated session with a server (e.g., server 150), the remote session manager 78 may borrow a remote session reference from the pool of remote session references. (See operation 600). The remote session manager 78 may then determine if a remote session reference(s) is available in the pool. (See operation 605) When the remote session manager 78 determines that there are no remote session references available in the pool or that the available remote session references are below a minimum, the remote session manager 78 may grow the pool in the manner described above with respect to FIG. 5. (See operation 610)

On the other hand, when the remote session manager 78 determines that there is an available remote session reference in the pool, the remote session manager 78 may perform a test on the borrowed remote session reference. (See operation 615). The remote session manager 78 may flag or mark the remote session reference as borrowed and perform a test on the borrowed remote session reference by checking a time period associated with the validation frequency to determine whether the time period (e.g., 10 minutes) has elapsed. The time period associated with the validation frequency may be measured from the most recent time in which the borrowed remote session reference was previously validated. If the time period has not elapsed, the remote session manager 78 may determine that the borrowed remote session reference references a session on the server (e.g., server 150) that has not timed-out and that the referenced session is still active. In this regard, the remote session manager 78 may determine that the test passed. As such, the remote session manager 78 may return or send the borrowed remote session reference to a server (e.g., server 150) and the server may use the borrowed remote session reference to establish an authenticated session with the computing device 145. (See operation 620)

On the other hand, when the remote session manger 78 determines that a more extensive test of the remote session reference should be performed, the remote session manager 78 may send a keep-alive signal (also referred to herein as a keep-alive URI) to the server (e.g., server 150). It should be pointed out that the remote session manager 78 may determine that a more extensive test of the borrowed remote session reference should be performed when the remote session manager 78 determines that the time period associated with the validation frequency has elapsed. The time period associated with the validation frequency may begin at the time in which the borrowed remote session reference was most recently validated.

The keep-alive signal may be a URI (e.g., website address) that requests the server to send the computing device 145 a response (e.g., a web page). (See operation 625) When the response is received from the server (e.g., server 150), the remote session manger 78 may validate the response to determine that the borrowed remote session reference is active and valid. (See operation 626) In this regard, the remote session manager 78 may send or return the borrowed remote session reference to the server 150 so that the server 150 may establish an authenticated session with the computing device 150. (See operation 620)

However, if the keep-alive signal is sent by the remote session manager 78 to the server and the remote session manager 78 does not receive confirmation or the expected response from the server (e.g., server 150) (e.g., the server does not respond to the keep-alive signal with a redirect to the logon page of the server), the remote session manager 78 may determine that the borrowed session reference references a session on the server that is inactive and/or invalid. When the remote session manager 78 determines that the borrowed session reference references a session on the server that is inactive or invalid, the remote session manager 78 may authenticate or re-authenticate the user associated with the remote session reference. (See operation 630) The remote session manager 78 may attempt to authenticate a user by sending the logon form which includes a username and password to the server and the server may use the username and password to authenticate a user.

Once the remote session manager 78 has sent the authentication request to the server (e.g., server 150), the remote session manager 78 may determine whether the borrowed remote session was successfully authenticated by validating the response from the server (e.g., server 150). (See operation 635) When the remote session manager 78 determines that the borrowed remote session reference has been successfully authenticated, the remote session manager 78 may provide the borrowed remote session reference to the server 150 and the server 150 may establish an authenticated session with the computing device 145. (See operation 620) In contrast, if the remote session manager 78 determines that the borrowed remote session reference was not successfully authenticated, the remote session manager 78 may generate or produce an error notification. (See operation 640) The error notification may be provided by the remote session manager 78 to the display 80 of the computing device 145.

d. Shrink One or More Remote Session References from the Pool

Referring now to FIG. 7, a flowchart of an exemplary method for shrinking or removing one or more remote session references from the pool according to an exemplary embodiment is provided. For instance, the pool may be shrunk in order to reduce the pool to the minimum number of remote session references that are defined for the pool. In this regard, the remote session manager 78 may determine whether one or more remote session references in the pool are idle. (See operation 700) It should be pointed out that "idle" as referred to herein may refer to a remote session reference(s) in the pool that is not currently being used. The remote session manager 78 may determine whether one or more remote session references are idle by performing a test or check to determine whether the remote session references are being used during periodic time periods (e.g., every 5 minutes).

When the remote session manager 78 determines that a remote session reference is idle, the remote session manager 78 may test the idle remote session reference. (See operation 705). It should be pointed out that the remote session manager 78 may test the idle remote session reference by sending a server (e.g., server 150) a keep-alive signal (e.g., URI of a web page). If the remote session manager 78 receives confirmation or the expected response (e.g., webpage) from the server (e.g., server 150), the remote session manager 78 may determine that the test is successful. On the other hand, if the remote session manager 78 does not receive confirmation or the expected response (e.g., the server does not respond to the keep-alive signal with a redirect to the logon page of the server), the remote session server may determine that the keep-alive signal failed and may attempt to authenticate or re-authenticate the remote session reference by sending the server a logon form with a username and password of a user. When the remote session manager 78 receives confirmation or the expected response (e.g., webpage) indicating that that user is authenticated, the remote session manager 78 may determine that the test is successful. However, if the remote session manager 78 does not receive confirmation or the expected response (e.g., webpage) indicating that the user is authenticated the remote session server 78 may determine that the test is unsuccessful.

In response to the remote session manager 78 determining that the test is unsuccessful, the remote session manager 78 may evict or remove the respective remote session references from the pool. (See operation 720) On the other hand, when the remote session manager 78 determines that the test is successful, the remote session manager may determine whether the size of the pool is greater than a minimum number of remote session references. (See operation 715) When the remote session manager 78 determines that the pool includes more remote session references than the minimum number (e.g., four) of remote session references, the remote session manager 78 may evict or remove an idle remote session reference from the pool. (See operation 720)

Additionally, when the remote session manager 78 determines that the size of the pool is at or below a minimum number of remote session references predefined for the pool or the remote session manager 78 has evicted or removed an idle remote session reference from the pool, the remote session manager 78 may determine whether there are one or more other remote reference sessions that are idle in the pool. (See operation 725) In response to determining that there are one or more other remote session references in the pool that are idle, the remote session manager 78 may repeat one or more of operations 700, 705, 715 and 720. However, in response to the remote session manager 78 determining that none of the remote session references in the pool are idle, the remote session manager 78 may determine whether the size of the pool is below a minimum number of remote session references. (See operation 730). If the remote session manager 78 determines that the remote session references in the pool are not below the minimum, the process may end. On the hand, when the remote session manager 78 determines that the size of the pool is below the minimum number of remote session references, the remote session manager 78 may grow the pool. (See operation 735) The remote session manager 78 may grow the pool in the manner described above with respect to FIG. 5. After the remote session manager 78 grows the pool, the process may end.

e. Ensure Session References Ready when Needed

Referring now to FIG. 8, a flowchart of an exemplary method for ensuring one or more remote session references are ready and available when needed is provided according to an exemplary embodiment. The remote session references may need to be ready when needed to establish one or more authenticated sessions with a secure server (e.g. server 150). In this regard, the remote session manager 78 may determine whether one or more remote session references in the pool are idle. (See operation 800). When the remote session manager 78 determines that a remote session reference(s) in the pool is idle the remote session manager 78 may test the idle remote session reference(s). (See operation 805). In an exemplary embodiment, the remote session manager 78 may test the idle remote session reference(s) by sending a keep-alive signal to the server 150. If the remote session manager 78 receives confirmation or the expected response from the server (e.g., server 150), the remote session manager 78 may determine that the test passed and that the remote session reference(s) is ready to be used.

Conversely, if the remote session manager 78 determines that it did not receive confirmation or the expected response from the server (e.g., server 150), the remote session manager 78 may determine that the test failed and may attempt to authenticate or re-authenticate the remote session reference by sending a logon form, which includes at least a username and password, to the server (e.g., server 150). In this manner, the server may authenticate a user associated with the username and password and may send a response to the remote session manager 78 which confirms that a user was authenticated. When the remote session manager 78 receives confirmation or the expected response from the server, the remote session manager 78 may determine that a remote session reference(s) is now ready for use. Instead, the remote session manager 78 may determine that the previously idle remote session is ready to be used by the remote session manager 78 for establishing an authenticated session(s) with the server (e.g., server 150).

Once the remote session manager 78 determines that the tested remote session references have been successfully tested and are ready to be used, the remote session manager 78 may determine whether there are more remote session references that are idle in the pool. (See operation 810) When the remote session manager 78 determines that there are more remote session references that are idle in the pool, the remote session manager 78 may repeat operations 800, 805 and 810. In contrast, the process may end when the remote session manager 78 determines that there are no more remote session references that are idle in the pool.

f. Return One or More Session References to the Pool

Referring now to FIG. 9, a flowchart of an exemplary method for returning one or more remote session references to the pool according to an exemplary embodiment is provided. In this regard, when the remote session manager 78 determines that an application no longer desires to use a remote session reference(s) from the pool, the remote session manager 78 may return the remote session reference(s) to the pool. (See operation 900). The remote session manager 78 may test remote session reference(s) that is returned to the pool to determine whether the session is active or valid. (See operation 905)

It should be pointed out that the remote session manger 78 may test the remote session reference(s) that is returned to the pool by sending a keep-alive signal (e.g., URI for a website) to the server (e.g., server 150). If the remote session manager 78 receives confirmation or the expected response (e.g., webpage) from the server (e.g., server 150), the remote session manager 78 may determine that the test is successful.

Additionally, if the remote session manager 78 does not receive confirmation or the expected response from the server (e.g., server 150) when the keep-alive signal is sent to the server, the remote session manager 78 may send the logon form with the username and password to the server to authenticate a user. If the remote session manager 78 receives confirmation or the expected response (e.g., webpage) that the user associated with username and password is authenticated, the remote session manager 78 may also determine that the test is successful. In response to the remote session manager 78 determining that the test was successful, the remote session manager 78 may flag or mark the remote session reference(s) as available for usage. (See operation 910) However, if the remote session manager 78 does not receive confirmation or the expected response (e.g., webpage) that the user associated with the username and password is authenticated, the remote session manager 78 may determine that the test was unsuccessful and may determine that the remote session reference(s) is no longer valid. In this regard, the remote session manager 78 may remove the remote session reference(s) from the pool. (See operation 915)

General System Operation

For purposes of illustration and not of limitation, consider an example in which the client devices 100, 110, 120 and 130 have one or more client applications stored in a memory of the devices that may be implemented or executed by a processor. As an example, one of these client applications may be an application (also referred to herein as a staff application) associated with staff schedule information, but the staff application may not know when one or more employees have clocked in and out for a work shift. However, a time keeping application stored on a server, such as for example server 150, may track and know when one or more employees clock in and out for a given work shift. In this regard, the time keeping application may be a secured web application that is accessible via a network (e.g., network 170) and maintained by a server (e.g., server 150).

Suppose further that in order to access one or more time entry screens provided by the time keeping application that a remote session (e.g., remote HTTP session) on the server may first need to be authenticated by logging into the server with a username and password. Once the session is authenticated a single session may be used to retrieve a time entry screen for different employees. However, the exemplary embodiments are also capable of using one or more previously authenticated remote sessions on the server 150 to establish multiple sessions with a server (e.g., server 150) even when more than one request for resources is made to the server at the same time using the same remote session.

To facilitate requests by client devices (e.g., client devices 100, 110, 120, 130) for time entry forms provided by the time keeping application of the server, a device such as for example, computing device 145 may be utilized. In this regard, the computing device 145, may but need not be, an intermediary device between the client devices and the server. As such, the computing device may receive requests for resources from the client devices and may send the requests to the server (e.g., server 150) on behalf of the client devices. When the computing device receives a response from the server, the computing device may, but need not, send the requested resources to the client device(s) that requested the resource. In an exemplary embodiment, the remote session manager 78 of computing device 145 may generate and maintain a pool of remote session references (e.g., remote HTTP sessions) that may be used to establish authenticated sessions with a server.

It should be pointed out that the remote session manager 78 of the computing device 145 may generate the pool of remote session references during start up or initialization of the computing device. The number of remote session references generated for the pool, by the remote session manager 78, may be based on a predefined minimum number of remote session references required to establish the pool, as described above with respect to FIG. 4. As described above, the remote session manager 78 may generate the remote session references in the pool by cloning a prototype remote session reference.

Additionally, the remote session manager 78 may arrange the remote session references by group and at least one remote session reference may be required for a group. In this regard, the groups may be sub-pools within the pool of remote session references and these sub-pools may be keyed by a name. In this manner, the key name may correspond to a sub-pool of remote session references that are all linked to each other. For instance, all the sessions in the sub-pool may have been authenticated by using the same username and password. As such, a sub-pool keyed by a name such as for example "remoteclient" may consist of sessions that are all authenticated using the same username (e.g., "remoteclient") and password (e.g., "McKesson"). As another example, a sub-pool keyed by the name "remoteadmin" may be authenticated using the same username and password which may correspond to a username and password of a user having administrative rights on a server (e.g., server 150). In this manner, the remote session manager 78 may determine which key to use to retrieve a remote session reference based on the rights associated with a particular key.

In this example, suppose that the remote session manager 78 created a group keyed by the name "mtamgr" denoting that managerial rights may be associated this group or sub-pool. The remote session manager 78 may create one or more sessions for this group by cloning a prototype to create a new remote session reference(s). The remote session manager 78 may also create the new remote session references such that all the session references may be logged in to the server 150 with a username "remotemanager" and password "McKesson" for example. It should be pointed out that in an exemplary embodiment, the new remote session references may not be authenticated on the server 150 until it is tested by the remote session manager 78 which typically happens the first time that it is borrowed from the pool or when the remote session manager 78 performs an eviction check, described more fully below. The session may be tested by the remote session manager 78 by sending a keep-alive signal (e.g., keep-alive URI e.g., website address) to the server in order to receive confirmation or an expected response (e.g., webpage) within a predetermined time period. If confirmation or the expected response is received by the remote session manager 78 within the predetermined time period, the remote session manager 78 may determine that the test passed.

In this exemplary embodiment, the remote session reference may have a validation frequency of 25 minutes which causes the remote session manager 78 to send a keep-alive signal at least every 25 minutes since the server 150 may be set to time out inactive sessions after 30 minutes. As such, if the keep-alive signal is sent, by the remote session manager 78, to the server every 25 minutes the session may be kept active. It should be pointed out that during the validation frequency, the remote session manager 78 may perform one or more eviction checks to determine whether to remove idle remote session references from the pool.

In this example, the remote session manger 78 may perform the eviction checks every 5 minutes. The first time the eviction check is run or performed by the remote session manager 78, the new remote session references may be tested and since the new remote session references may not have been previously logged on to the server 150, the remote session manager 78 may send their logon forms, which contains an associated username and password, to the server 150 and the server may use the username and password of the logon forms to establish authenticated sessions. The next four times that the eviction check is run by the remote session manager, the remote session manager 78 may determine that the new remote sessions are still active on the server 150 and may decide not to remove any remote session references from the pool. It should be pointed out that the remote session manager 78 may determine that the new sessions are still active since the time that has elapsed since the first check was run up to this point in time is 25 minutes (e.g., 5 eviction checks×5 mins.) which is less than the time out period of 30 minutes. The next eviction check (e.g., a sixth eviction check) that is run by the remote session manager 78 after 25 minutes have passed may result in the remote session manager 78 sending the logon forms of the new remote session references to the server 150 again to re-authenticate and re-establish the sessions since the remote session manager 78 may determine that the time out period (e.g., 30 mins. (e.g., 6 eviction checks×5 mins.)) has passed.

Suppose further for example that a first user (also referred to herein as user #1) of a client device (e.g., client device 100) logs on to the staff application of client device 100 with a username 'Sharon.Evans' which is designated as being associated with a manager. Suppose also that a second user (referred to herein as user #2) logs on to the staff application using another client device (e.g., client device 110) with a username 'Jason Tu' which is also designated as being associated with a manager. If user #1 utilizes the staff application of client device 100, for example, to make a selection to enter time for an employee designated as 'JTOWNSEND' the client device 100 may send a request for the time entry form to the computing device 145.

In this regard, the remote session manager 78 of the computing device 145 may borrow a remote session reference from the group named 'mtamgr' in the pool of remote session references since the remote session manager 78 may determine that the request is being received from a manager. The remote session manager 78 may perform a test on the remote session reference that is borrowed since each borrowed remote session reference is tested. In this example, the remote session manager 78 may determine that the borrowed remote session reference is active (e.g., the session has not timed out) and does not need to be re-authenticated. As such, the remote session manager 78 may provide or return the borrowed remote session reference to the server (e.g., server 150). Additionally, the remote session manager 78 may send a request to the server 150 for the time entry form desired by user #1. In response to receipt of the borrowed remote session reference and the request, the time keeping application of the server may provide the computing device 145 with the requested time entry form.

The computing device 145 may process the time entry form and return the borrowed remote session reference to the pool (for example in the manner described above with respect to FIG. 9). Thereafter, the remote session manager 78 may send the time entry form to client device 100 so that the time entry form may be displayed. In an alternative exemplary embodiment, the remote session manager 78 may modify the time entry form received by the server (e.g., server 150) to make it appear as if the computing device 145 created the time entry form and may return the borrowed remote session reference to the pool. Subsequently, the remote session manager 78 may send the time entry form to client device 100 so that the time entry form may be displayed. In response to sending the time entry form to the client device 100, the remote session manager may return the borrowed remote session reference to the pool.

It should be pointed out that if user #2 makes a selection to enter time for an employee designated as 'SJOHNSON' for example the same process as described above with respect to user #1 may occur. In this regard, since the request for the time entry form by user #1 has been processed by the computing device 145, the remote session manager 78 may borrow the same remote session reference that was used for providing the time entry form to user #1 in order to process a request by user #2 for a time entry form.

As another example, consider a situation in which user #1 and user #2 utilize client devices 100 and 110, respectively to request time entry forms for one of their employees. Suppose user #1 utilizes the client device 100 to submit a request for the time entry form to the computing device 145. In this regard, the remote session manager 78 may receive the request and borrow a remote session reference from the pool. The remote session manager 78 may test the borrowed remote session reference and determine that the borrowed remote session reference is still active and in this regard the remote session manager 78 may send the borrowed session reference to the server 150 to establish an authenticated session with the server (e.g., server 150). Additionally, the remote session manager 78 may send the request to the server 150. The server 150 may process the submitted request and send the computing device 145 a response with the requested time entry form. The remote session manager 78 may return the borrowed remote session reference to the pool and may send the time entry form to the client device 100 so that it may be utilized by the staff application.

Suppose further that one second after user #1 makes a request for a time entry form for one of his/her employees that user #2 makes a request for a time entry form for one of his/her employees. The computing device 145 may receive the request for the time entry form from client device 110 and may attempt to borrow a remote session reference from the pool. In this example, the remote session manager 78 may determine that that there are no available remote sessions references in the pool. In this regard, the remote session manager 78 may create a new remote session reference by cloning a prototype remote session reference, in the manner described above. The remote session manager 78 may borrow the newly created remote session reference from the pool and may perform a test on the new remote session reference. In this example, the remote session manager 78 may determine that the new remote session reference is not active and may send a logon form of the new remote session reference to the server 150 and the server 150 may utilize the username and password associated with the logon form to authenticate a user associated with the username and password of the logon form. Thereafter, the remote session manager 78 may send the new remote session reference to the server 150 to authenticate the session and the remote session manager 78 may send the time entry form requested by user #2 to the server 150. In response, the server 150 may send the time entry form to the computing device 145 and the remote session manager 78 may return the borrowed remote session reference to the pool. Thereafter, the remote session manager 78 may send the requested time entry form to client device 110.

Referring now to FIG. 10, a flowchart of an exemplary method for generating and maintaining a pool of remote session references that may be utilized to establish one or more authenticated sessions according to an exemplary embodiment is provided. At operation 1000, the remote session manager 78 may generate one or more remote session references that are maintained in a pool of remote session references. The remote session manager 78 may generate the remote session references upon initialization of a device (e.g., computing device 145) and may generate the remote session references according to a number of minimum remote session references that are defined for the pool in the manner described above with respect to FIG. 4, for example. Optionally, at operation 1005, the remote session manager 78 may create one or more sub-groups in the pool and each of the sub-groups may be defined to have one or more remote session references. The remote session references may be keyed by the remote session manager 78 such that the remote session references in the sub-group are assigned the same username and password and the same privileges or rights. Optionally, at operation 1010, the remote session manager 78 may periodically test idle remote session references in the pool. In an exemplary embodiment, the remote session manager 78 may determine if remote session references are idle and test the idle remote session reference(s) in the manner described above with respect to FIG. 7.

At operation 1015, when a request for a resource on a secured device (e.g., server 150) is received, the remote session manager 78 may determine whether at least one of the remote session references in the pool may be borrowed. In one exemplary embodiment the remote session manager 78 may determine whether at least one remote session reference may be borrowed by determining whether there are any idle (e.g., unused and available) remote session references in the pool.

At operation 1020, when the remote session manager 78 determines that one of the remote session references in the pool may be borrowed, the remote session manager 78 may test the borrowed remote session reference to determine whether it is currently authenticated. In an exemplary embodiment, the remote session manager may test the borrowed remote session reference by determining whether a time since the borrowed remote session reference was last tested is longer than a validation frequency (e.g., in this regard, the validation frequency may be used by the remote session manager 78 to determine how often to perform the more extensive test on the remote session reference). If the remote session manager 78 determines that the time since the last test is longer than the validation frequency, the borrowed remote session reference may be validated by sending a keep-alive signal to the secure device. If the keep-alive signal fails, the remote session manager 78 may send a logon form to the secure device to authenticate the borrowed remote session reference.

At operation 1025, when the determination reveals that one of the remote session references in the pool may not be borrowed, the remote session manager 78 may generate a new remote session reference to be borrowed by cloning a prototype remote session reference. At operation 1030, the remote session manager 78 may test the borrowed remote session reference created from the prototype (also referred to herein as borrowed new remote session reference) to determine whether it is currently authenticated.

At operation 1035, when the remote session manager 78 determines that the test passed, the remote session manager may provide the secured device (e.g., server 150) with the borrowed remote session reference, or the borrowed new remote session reference, and send the secured device a request for a desired resource(s). At operation, 1040, the remote session manager 78 may return the borrowed remote session reference, or the borrowed new remote session reference, to the pool in response to receiving the requested resource(s) from the secured device (e.g., server 150). In an exemplary embodiment, the borrowed remote session reference, or the borrowed new remote session reference, may be returned to the pool in the manner described above with respect to FIG. 9. Additionally, in an exemplary embodiment, the remote session manager 78 may send the requested resource(s) to another device (e.g., any of client devices 100, 110, 120, 130).

It should be pointed out that FIGS. 4-10 are flowcharts of a system, method and computer program product according to exemplary embodiments of the invention. It will be understood that each block or step of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory 86) and executed by a processor (e.g., processor 70, remote session manager 78). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks or steps to be implemented. In some embodiments, the computer program instructions are stored in a computer-readable memory that can direct a computer or other programmable apparatus to function in a particular manner, such that the instructions stored in the computer-readable memory produce an article of manufacture including instructions which implement the function specified in the flowcharts blocks or steps. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts blocks or steps.

Accordingly, blocks or steps of the flowcharts support combinations of means for performing the specified functions and combinations of steps for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In an exemplary embodiment, an apparatus for performing the methods of FIGS. 4-10 above may comprise a processor (e.g., the processor 70) configured to perform some or each of the operations described above. The processor may, for example, be configured to perform the operations by performing hardware implemented logical functions, executing stored instructions, or executing algorithms for performing each of the operations. Alternatively, the apparatus may comprise means for performing each of the operations described above. In this regard, according to an example embodiment, examples of means for performing operations may comprise, for example, the processor 70 (e.g., as means for performing any of the operations described above), the remote session manager 78 and/or a device or circuit for executing instructions or executing an algorithm for processing information as described above.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
generating two or more remote session references that are maintained in a pool, the remote session references comprise information that is utilized to establish one or more respective authenticated sessions with a secure device;
determining whether at least one of the remote session references is borrowable from the pool in response to receipt of a request for one or more resources on the secure device;
performing, via a processor, a test on a borrowed remote session reference when the determination reveals that at least one of the remote session references is borrowable from the pool;
providing the secure device with the borrowed remote session reference and a request for the resources in response to determining that the test passed;
returning the borrowed remote session reference to the pool in response to receipt of the resources from the secure device;
generating a new remote session reference by copying a prototype remote session reference in response to the determination revealing that at least one remote session reference is not borrowable from the pool;
borrowing the new remote session reference from the pool;
performing the test on the new remote session reference;
providing the secure device with the new remote session reference and the request for the resources in response to determining that the test passed;
establishing an authenticated session with the secure device based at least in part on the new remote session reference; and
returning the new remote session reference to the pool in response to receipt of the resources from the secure device.

2. The method of claim 1, wherein prior to returning the borrowed remote session reference the method further comprises:
establishing an authenticated session with the secure device based at least in part on the borrowed remote session reference, and wherein
returning the borrowed remote session reference further comprises returning the borrowed remote session reference to the pool of two or more remote session references to enable usage of the borrowed remote session reference to establish another authenticated session.

3. The method of claim 2, further comprising providing at least a portion of the resources to another device.

4. The method of claim 1, wherein generating the remote session references comprises copying a prototype remote session reference a number of times to obtain a minimum number of remote session references that are defined for the pool.

5. The method of claim 4, wherein the prototype remote session reference comprises information associated with at least one of a host name of the secure device, a port number of the secure device, a name of an application on the secure device, a username and a password, wherein the username and password are utilized by the secure device to authenticate a user.

6. The method of claim 1, further comprising:
creating one or more groups in the pool, each of the groups comprises at least one remote session reference;
assigning the same username and password to at least one of the groups; and
assigning the same rights and privileges to the remote session reference in the at least one group.

7. The method of claim 1, further comprising providing at least a portion of the resources to another device.

8. The method of claim 1, wherein the test comprises determining whether the borrowed remote session reference is currently authenticated by sending a keep-alive signal to the secure device and determining whether a confirmation or an expected response is received from the secure device within a predetermined time period, wherein the method further comprises:
sending a logon form to the secure device, the logon form comprises information identifying a username and password, the secure device uses the username and password to authenticate the borrowed remote session reference when the confirmation or the expected response is not received within the predetermined time period.

9. The method of claim 1, wherein the test is performed periodically during one or more time periods which each have a duration that is less than a duration of a time period for deactivating an inactive session and wherein the method further comprises:

removing at least one of the remote session references that have not been used to establish an authenticated session with the secure device for a predetermined time period.

10. The method of claim 1, wherein generating the remote session references further comprises, automatically generating the remote session references upon startup of an apparatus.

11. An apparatus comprising:
at least one processor; and
at least one memory including computer program code configured to, with the at least one processor, cause the apparatus to:
generate two or more remote session references that are maintained in a pool, the remote session references comprise information that is utilized to establish one or more respective authenticated sessions with a secure device;
determine whether at least one of the remote session references is borrowable from the pool in response to receipt of a request for one or more resources on the secure device;
perform a test on a borrowed remote session reference when the determination reveals that at least one of the remote session references is borrowable from the pool;
provide the secure device with the borrowed remote session reference and a request for the resources in response to determining that the test passed;
return the borrowed remote session reference to the pool in response to receipt of the resources from the secure device;
generate a new remote session reference by copying a prototype remote session reference in response to the determination revealing that at least one remote session reference is not borrowable from the pool;
borrow the new remote session reference from the pool;
perform the test on the new remote session reference;
provide the secure device with the new remote session reference and the request for the resources in response to determining that the test passed;
establish an authenticated session with the secure device based at least in part on the new remote session reference; and
return the new remote session reference to the pool in response to receipt of the resources from the secure device.

12. The apparatus of claim 11, wherein prior to return the borrowed remote session reference, the memory and computer program code are configured to, with the processor, cause the apparatus to:
establish an authenticated session with the secure device based at least in part on the borrowed remote session reference; and
return the borrowed remote session reference by returning the borrowed remote session reference to the pool of two or more remote session references to enable usage of the borrowed remote session reference to establish another authenticated session.

13. The apparatus of claim 12, wherein the memory and computer program code are configured to, with the processor, cause the apparatus to:
provide at least a portion of the resources to another device.

14. The apparatus of claim 11, wherein the memory and computer program code are configured to, with the processor, cause the apparatus to:
generate the remote session references by copying a prototype remote session reference a number of times to obtain a minimum number of remote session references that are defined for the pool.

15. The apparatus of claim 11, wherein the memory and computer program code are configured to, with the processor, cause the apparatus to:
create one or more groups in the pool, each of the groups comprises at least one remote session reference;
assign the same username and password to at least one of the groups; and
assign the same rights and privileges to the remote session reference in the at least one group.

16. The apparatus of claim 11, wherein the memory and computer program code are configured to, with the processor, cause the apparatus to:
provide at least a portion of the resources to another device.

17. The apparatus of claim 11, wherein the test comprises determining whether the borrowed remote session reference is currently authenticated and wherein the memory and computer program code are configured to, with the processor, cause the apparatus to:
perform the test by sending a keep-alive signal to the secure device and determine whether a confirmation or an expected response is received from the secure device within a predetermined time period: and
send a logon form to the secure device, the logon form comprises information identifying a username and password, the secure device uses the username and password to authenticate the borrowed remote session reference when the confirmation or the expected response is not received within the predetermined time period.

18. The apparatus of claim 11, wherein the memory and computer program code are configured to, with the processor, cause the apparatus to:
perform the test periodically during one or more time periods which each have a duration that is less than a duration of a time period for deactivating an inactive session; and
remove at least one of the remote session references that have not been used to establish an authenticated session with the secure device for a predetermined time period.

19. The apparatus of claim 11, wherein the memory and computer program code are configured to, with the processor, cause the apparatus to:
automatically generate the remote session references upon startup of the apparatus.

20. A computer program product comprising at least one non-transitory computer-readable storage medium having computer-executable program code instructions stored therein, the computer executable program code instructions comprising:
program code instructions for generating two or more remote session references that are maintained in a pool, the remote session references comprise information that is utilized to establish one or more respective authenticated sessions with a secure device;
program code instructions for determining whether at least one of the remote session references is borrowable from the pool in response to receipt of a request for one or more resources on the secure device;
program code instructions for performing a test on a borrowed remote session reference when the determination reveals that at least one of the remote session references is borrowable from the pool;
program code instructions for providing the secure device with the borrowed remote session reference and a request for the resources in response to determining that the test passed; and program code instructions for returning the borrowed remote session reference to the pool in response to receipt of the resources from the secure device;

program code instructions for generating a new remote session reference by copying a prototype remote session reference in response to the determination revealing that at least one remote session reference is not borrowable from the pool;

program code instructions for borrowing the new remote session reference from the pool;

program code instructions for performing the test on the new remote session reference;

program code instructions for providing the secure device with the new remote session reference and the request for the resources in response to determining that the test passed;

program code instructions for establishing an authenticated session with the secure device based at least in part on the new remote session reference; and program code instructions for returning the new remote session reference to the pool in response to receipt of the resources from the secure device.

21. The computer program product of claim 20, wherein prior to returning the borrowed remote session reference the computer program product further comprises:

program code instructions for establishing an authenticated session with the secure device based at least in part on the borrowed remote session reference, and wherein returning the borrowed remote session reference further comprises returning the borrowed remote session reference to the pool of two or more remote session references to enable usage of the borrowed remote session reference to establish another authenticated session.

* * * * *